US011698639B2

(12) United States Patent
Goyal et al.

(10) Patent No.: US 11,698,639 B2
(45) Date of Patent: Jul. 11, 2023

(54) PREDICTING JAYWALKING BEHAVIORS OF VULNERABLE ROAD USERS

(71) Applicant: Waymo LLC, Mountain View, CA (US)

(72) Inventors: Vishu Goyal, Mountain View, CA (US); Kai Ding, Santa Clara, CA (US)

(73) Assignee: Waymo LLC, Mountain View, CA (US)

(*) Notice: Subject to any disclaimer, the term of this patent is extended or adjusted under 35 U.S.C. 154(b) by 292 days.

(21) Appl. No.: 16/892,579

(22) Filed: Jun. 4, 2020

(65) Prior Publication Data
US 2021/0382489 A1  Dec. 9, 2021

(51) Int. Cl.
G05D 1/00 (2006.01)
G05D 1/02 (2020.01)

(52) U.S. Cl.
CPC ......... *G05D 1/0214* (2013.01); *G05D 1/0088* (2013.01); *G05D 2201/0213* (2013.01)

(58) Field of Classification Search
CPC . B60W 2554/4026; B60W 2554/4029; B60W 2556/10; B60W 50/0097; B60W 60/0027; G05D 1/0088; G05D 1/0214; G05D 2201/0213
See application file for complete search history.

(56) References Cited

U.S. PATENT DOCUMENTS

| 9,120,484 | B1 | 9/2015 | Ferguson et al. |
| 9,381,916 | B1 | 7/2016 | Zhu et al. |
| 9,669,827 | B1 | 6/2017 | Ferguson et al. |
| 10,059,334 | B1 | 8/2018 | Zhu et al. |
| 10,486,707 | B2 | 11/2019 | Zelman et al. |
| 2006/0041381 | A1 | 2/2006 | Simon et al. |
| 2008/0084283 | A1 | 4/2008 | Kalik |
| 2010/0205132 | A1 | 8/2010 | Taguchi |
| 2013/0024075 | A1 | 1/2013 | Zagorski et al. |
| 2018/0096605 | A1 | 4/2018 | Bai et al. |
| 2018/0118106 | A1* | 5/2018 | You ...................... G06V 40/103 |
| 2019/0152490 | A1* | 5/2019 | Lan ................. B60W 60/00276 |
| 2020/0207375 | A1* | 7/2020 | Mehta ............. B60W 60/00276 |
| 2020/0307563 | A1* | 10/2020 | Ghafarianzadeh .......................... B60W 30/0956 |
| 2021/0078598 | A1* | 3/2021 | Kim ....................... G06N 20/00 |

* cited by examiner

*Primary Examiner* — Hunter B Lonsberry
*Assistant Examiner* — Matthew J. Reda
(74) *Attorney, Agent, or Firm* — Fish & Richardson P.C.

(57) ABSTRACT

Jaywalking behaviors of vulnerable road users (VRUs) such as cyclists or pedestrians can be predicted. Location data is obtained that identifies a location of a VRU within a vicinity of a vehicle. Environmental data is obtained that describes an environment of the VRU, where the environmental data identifies a set of environmental features in the environment of the VRU. The system can determine a nominal heading of the VRU, and generate a set of predictive inputs that indicate, for each of at least a subset of the set of environmental features, a physical relationship between the VRU and the environmental feature. The physical relationship can be determined with respect to the nominal heading of the VRU and the location of the VRU. The set of predictive inputs can be processed with a heading estimation model to generate a predicted heading offset (e.g., a target heading offset) for the VRU.

19 Claims, 9 Drawing Sheets

Roadgraph

PREDICTING JAYWALKING BEHAVIORS OF VULNERABLE ROAD USERS

BACKGROUND

Autonomous vehicles use a variety of on-board sensors and computer systems to detect nearby objects and use such detections to make control and navigation decisions. Vulnerable road users ("VRUs") such as cyclists, pedestrians, and low-speed vehicles are commonly found on roadways where autonomous vehicles operate.

SUMMARY

This specification describes systems, methods, devices, and other techniques for predicting jaywalking behaviors of VRUs. VRUs often engage in movements and maneuvers that are significantly different from that of primary road users such as cars, trucks, or motorcycles. For example, unlike primary road users, VRUs may not comply with ordinary traffic regulations and may attempt to cross roadways using irregular movements that do not align with prevailing traffic patterns. Nonetheless, primary road users commonly share the roads with VRUs, and an autonomous vehicle (e.g., a self-driving car) must take care to safely operate the vehicle in their presence. This specification describes machine-learning techniques and predictive models that can be used to predict whether a VRU is likely to jaywalk and cut-in front of a vehicle such as a self-driving car. Further, for VRUs that are predicted to jaywalk, techniques are described for predicting an ultimate heading of the VRU toward a terminal location (e.g., a location across a street where the jaywalker is headed). A heading estimation model (e.g., which can also be referred to as a 'jaywalking target estimation model' or 'jaywalking target prediction model'), for example, can predict an offset to the nominal heading of the VRU that indicates how much the VRU's heading is likely to change in order to arrive at the VRU's terminal location. Planning and control systems of the autonomous vehicle can then account for the predicted heading, predicted terminal location, or both, when making autonomous driving decisions.

Some implementations of the subject matter described herein include methods performed by a system of one or more computers. The methods can include obtaining (i) location data that identifies a location of a vulnerable road user (VRU) detected within a vicinity of a vehicle traveling on a roadway and (ii) obtaining environmental data that describes an environment of the VRU, where the environmental data identifies a set of environmental features in the environment of the VRU. The system can determine a nominal heading of the VRU, and generate a set of predictive inputs that indicate, for each of at least a subset of the set of environmental features, a physical relationship between the VRU and the environmental feature. The physical relationship can be determined with respect to the nominal heading of the VRU and the location of the VRU. The set of predictive inputs can be processed with a heading estimation model to generate a predicted heading offset for the VRU.

These and other implementations can, in some examples, include one or more of the following features.

The system can use the predicted heading offset, or a value derived from the predicted heading offset, to plan a movement of the vehicle traveling on the roadway.

An absolute predicted heading of the VRU can be determined based on a sum of the nominal heading of the VRU and the predicted heading offset for the VRU.

The system can assign a current heading of the VRU as the nominal heading of the VRU.

The system can further perform actions of selecting a first environmental feature of the set of environmental features, and determining a location of a point along the first environmental feature. Determining the nominal heading of the VRU can include determining a vector between the VRU and the point along the first environmental feature, and assigning a direction of the vector as the nominal heading of the VRU.

The first environmental feature can be a road edge. The point along the first environmental feature can be selected based on being the closest point along the road edge to the VRU. The nominal heading indicates a direction from the VRU to the closest point along the road edge.

Based on a location history of the VRU and the environmental data, a jaywalking prediction can be determined that indicates whether the VRU is jaywalking or is likely to jaywalk on the roadway traveled by the vehicle. The system can generate the predicted heading offset for the VRU in response to the jaywalking prediction indicating that the VRU is jaywalking or is likely to jaywalk on the roadway traveled by the vehicle.

The system can be configured not to generate a predicted heading offset for the VRU in response to the jaywalking prediction indicating that the VRU is not jaywalking and is not likely to jaywalk on the roadway traveled by the vehicle.

A second set of predictive inputs can be generated based on the location history of the VRU and the environmental data. The second set of predictive inputs can be processed with a jaywalking prediction model to generate the jaywalking prediction, and the jaywalking prediction model can be a machine-learning model that was trained using a supervised machine-learning technique.

The jaywalking prediction model can be or include a decision tree, a random decision forest, an artificial neural network, or a regression model.

The set of environmental features can include at least one of a road edge, a lane boundary, a sidewalk, a bicycle lane, a road curb, or an intersection.

The VRU can be a pedestrian, a cyclist, or a low-speed motorized vehicle.

The vehicle can be a fully autonomous or semi-autonomous vehicle.

Sensor data captured by a sensing system of the vehicle can be analyzed to classify the VRU as one of a set of pre-defined VRU types. The system can select, from among a set of pre-defined heading estimation models that correspond to different ones of the set of pre-defined types of VRUs, a first heading estimation model to use as the heading estimation model for processing the set of predictive inputs and generating the predicted heading offset for the VRU, the first heading estimation model corresponding to the classified type of the VRU.

The predicted heading offset can include a range of heading offset values that reflect a level of confidence or uncertainty in the prediction.

The predicted heading offset can be used to predict a terminal location of the VRU, where the terminal location can include a point or a segment of a first environmental feature at which the VRU is predicted to intersect the first environmental feature.

The first environmental feature can be or include a road edge.

The heading estimation model can be a machine-learning model that was trained using a supervised machine-learning technique.

The physical relationship between the VRU and a first environmental feature of the set of environmental features, as indicated by a first predictive input of the set of predictive inputs, can include at least one of a positional relationship, a distal relationship, or an angular relationship between the VRU and the first environmental feature.

Further aspects of the subject matter disclosed herein include a system comprising a memory and data processing apparatus configured to perform any of the methods or processes described herein. Some implementations provide one or more non-transitory computer-readable media encoded with instructions that, when executed by data processing apparatus, cause the data processing apparatus to perform operations according to any of the methods or processes described herein.

Some implementations of the subject matter disclosed in this specification may realize one or more of the following advantages. First, by predicting behaviors of VRUs in the proximity of a self-driving car, autonomous driving decisions can be made that account for the future behaviors of the VRUs. In this manner, the self-driving car may not only plan maneuvers based on the current locations and headings of VRUs, but may also plan maneuvers based on their predicted locations and headings. Second, through use of machine-learning models, the system may realize improved accuracy, precision, and/or recall relative to other approaches such as heuristic-based models. The machine-learning models may also be trained on larger datasets that expose the model to a greater number of features and sample scenarios. Third, computational expense can be reduced by selectively generating predicted headings of agents (e.g., VRUs) in the environment only when the agent is first detected to be currently jaywalking or first predicted as likely to jaywalk within a period of time. Fourth, the approach described in this specification can advantageously permit training of a jaywalking prediction model and a heading estimation model independently of each other.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
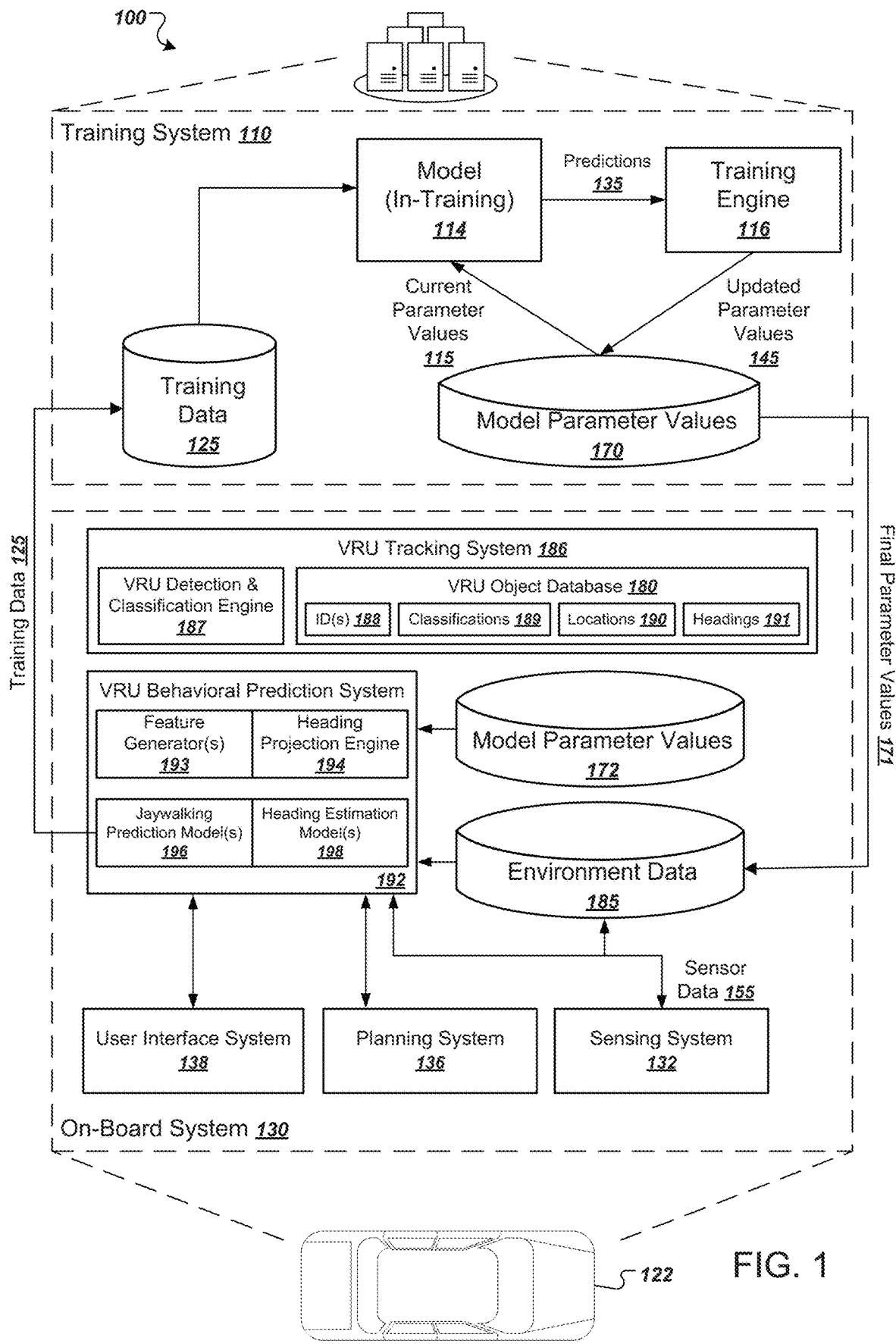
FIG. 1 depicts an example environment of computing systems configured to train and apply machine-learning models to tasks related to the prediction of behaviors of VRUs.

FIG. 1 depicts an example environment 100 of computing systems configured to train and apply machine-learning models to tasks related to the prediction of behaviors of vulnerable road users (VRUs). Unlike typical large vehicles driven by licensed operators or sophisticated autonomous driving systems, VRUs often exhibit behavior that differs substantially from that of primary road users such as licensed users of cars, trucks, and motorcycles. For example, pedestrians may attempt to jaywalk from one side of a street to another, regardless of whether the street crossing complies with pedestrian traffic signs or signals. Due to their relatively small size, pedestrians may exploit even short gaps in vehicle traffic to cross roadways. Likewise, cyclists commonly occupy portions of a roadway, including standard vehicle lanes, reserved bike lanes, or both and sometimes veer into traffic or engage in jaywalking to cross from one side of a street to another. VRUs may be exempt from or otherwise disregard certain traffic rules and practices followed by non-vulnerable road users such as licensed operators of passenger or commercial vehicles. The systems within environment 100 employ machine-learning models (e.g., jaywalking prediction model(s) 196 and heading estimation model(s) 198) to predict whether a VRU is likely to jaywalk, and if so, to predict a likely heading and destination of the VRU. In some implementations, systems onboard the self-driving car 122, or other autonomous or semi-autonomous road vehicle, use these predictions of VRU behavior to plan safe driving maneuvers will avoid collisions or other unsafe interactions with VRUs in the vicinity of the self-driving car 122. As used in this specification, the term "jaywalking" is not necessarily limited to an illegal road-crossing but can encompass any incident where a VRU moves onto or crosses a roadway where non-VRUs are driven, such as to cross from one side of the roadway to another (or for other purposes). In some implementations, the prediction of jaywalking activity can be restricted to a subset of incidents where a VRU moves onto or crosses a roadway, such as incidents where the VRU crosses lanes dedicated for non-VRUs, or incidents where the VRU enters the roadway against applicable laws or regulations. In other implementations, the prediction of jaywalking activity is not so restricted.

The environment 100 can include both a training system 110 and an on-board system 130. On-board system 130 can include one or more computers and other devices physically located on the self-driving car 122, while training system 110 can be implemented remotely from the self-driving car 122 in whole or in part. Generally, self-driving car 122 is an autonomous vehicle capable of planning and self-executing driving maneuvers (e.g., steering, braking, accelerating) to navigate to a goal location at least partially independent of human supervision or operation.

On-board system 130 can include a sensing system 132 having components configured to sense information about the vehicle's environment. For example, sensing system 132 can include sensing equipment for capturing reflections of electromagnetic radiation emitted by energy sources on-board the self-driving car 122, such as a light detection and ranging (LIDAR) subsystem, a radio detection and ranging (RADAR) subsystem, or both. The LIDAR subsystem detects and processes reflections of laser light, while the RADAR system detects and processes reflections of radio waves. LIDAR or RADAR subsystems can output information describing a distance, direction, and/or intensity of reflected radiation. For example, these subsystems may transmit pulses of electromagnetic radiation in a specific direction and measure the intensity and phase shift of reflections. A distance between the radiation source and an object in the environment can be computed based on a time delay between a pulse emission and its corresponding reflection. Each sensor can continually sweep a particular space in angle, azimuth, or both. Sweeping in azimuth, for example, can allow a sensor to detect multiple objects along a same line of sight. Sensing system 132 can further include one or more camera subsystems for detecting and imaging visible light. The output of sensing system 132 is sensor data 155 that contains observations of the environment surrounding self-driving car 122. For example, sensor data 155 can include point clouds generated from LIDAR signals or images captured by cameras in the camera subsystem. In some implementations, sensor data 155 can be extracted that corresponds to a portion of the environment surrounding and/or encompassing particular objects (e.g., VRUs) in a vicinity of the self-driving car 122.

To allow the self-driving car 122 to monitor VRUs proximate to the car 122, on-board system 130 further includes a VRU tracking system 186 and VRU behavioral prediction system 192. The tracking system 186 and behavioral prediction system 192 can each be implemented on one or more computers or other data processing apparatus on the self-driving car 122. A detection and classification engine 187 of tracking system 186 processes sensor data 155 to identify VRUs (and, optionally, other objects) in a vicinity of the self-driving car 122. Engine 187 can additionally classify detected VRUs according to type, e.g., to indicate whether a particular VRU is a pedestrian, a cyclist, a scooter, or other low-speed vehicle. Any suitable object detection and recognition algorithms may be applied by the detection and classification engine 187 to detect and classify objects represented in the sensor data 155. When a VRU has been detected, information about it can be stored in object database 180. For example, the VRU may be assigned an ID, and the ID can be stored in database element 188. Information about the VRU's classification (e.g., type), current location and/or location history at one or more previous time steps, and current heading and/or heading history at one or more previous time steps can be stored in database elements 189, 190, and 191, respectively. The location and heading of the VRU can also be determined based on analysis of sensor data 155, e.g., by measuring a position of the VRU relative to self-driving car 122 and identifying an orientation of the VRU within images or point clouds of the environment.

The behavioral prediction system 192 forecasts behavior (e.g., movements) of a detected VRU over a future period of time (e.g., a pre-defined number of time steps into the future). For example, prediction system 192 may predict VRU behavior over a number of time steps that corresponds 1, 2, 5, 10, 15, or 20 seconds into the future. System 192 provides a number of sub-components including feature generator 193, heading projection engine 194, one or more jaywalking prediction models 196, and one or more heading estimation models 198. Generally, the jaywalking prediction models 196 are configured to predict whether a detected VRU will engage in jaywalking at some point within the prediction time window. The jaywalking prediction models 196 can generate jaywalking prediction value that indicates a likelihood that the VRU will jaywalk within the prediction time window. In other implementations, the jaywalking prediction models 196 can generate a jaywalking prediction in the form of a binary classification the VRU either is or is not predicted to jaywalk within the prediction time window. The binary classification can be determined by comparing a jaywalking prediction likelihood value to a threshold, for example. In some implementations, the prediction time window for the models 196 encompasses not just future time steps but also a current time step. As a result, the jaywalking prediction output by model 196 signifies not just a prediction of future jaywalking but also an indication of current jaywalking behavior. In some implementations, a universal jaywalking prediction model 196 can be employed for any detected VRU regardless of its type classification. In other implementations, multiple jaywalking prediction models 196 are provided that each correspond to a different type classification (e.g., pedestrian, cyclist, scooter). The prediction system 192 can then select an appropriate one of the models 196 according to the type classification of the VRU, as determined by the VRU detection and classification engine 187. The provision of multiple jaywalking prediction models 196 can be advantageous in some cases so that each can be more finely tuned to the unique behavior of a different VRU type, and prediction accuracy may be improved.

If a jaywalking prediction model 196 predicts that a VRU is or will be jaywalking within the prediction time window, the prediction system 192 can invoke a heading estimation model 198 to predict an ultimate heading of the VRU. The ultimate heading of the VRU corresponds to the direction of a vector from the current location of the VRU to a terminal location of the VRU's current or predicted jaywalking. In some examples, the terminal location is a point along a road edge where the VRU is predicted to leave the road on which the jaywalking activity occurs (or is predicted to occur). Terminal locations corresponding to environmental features other than a road edge are also possible, such as lane boundaries (e.g., a boundary between a car lane and a cycling or pedestrian lane), sidewalk boundaries, boundaries of physical barriers (e.g., fences or walls), intersection boundaries, or the like. In practice, VRUs often make turns, curves, or other non-linear movements rather than maintain a static heading for the entire duration of a jaywalking event. As a consequence, the current heading of a VRU that can be observed and measured based on sensor data 155 is not always a reliable indicator of the VRU's ultimate heading or its terminal location. To facilitate improved predictions, a heading estimation model 198 predicts an offset to the VRU's nominal heading (e.g., current heading), where the offset represents a difference how much the VRU's nominal heading is likely to change in order to reach the terminal location of the jaywalking event. In other words, the predicted heading offset indicates an estimated difference between the VRU's nominal heading and ultimate heading. The offset and other heading values can be expressed in degrees, radians, or another appropriate convention. With the predicted offset from heading estimation model 198, the prediction system can then determine the VRU's predicted ultimate heading by adding the offset to the nominal heading.

In some implementations, a universal heading estimation model 198 can be employed for any detected VRU regardless of its type classification. In other implementations, multiple heading estimation models 198 are provided that each correspond to a different type classification (e.g., pedestrian, cyclist, scooter). The prediction system 192 can then select an appropriate one of the models 198 according to the type classification of the VRU, as determined by the VRU detection and classification engine 187. The provision of multiple heading estimation models 198 can be advantageous in some cases so that each can be more finely tuned to the unique behavior of a different VRU type, and prediction accuracy may be improved.

As explained in further detail with respect to FIGS. 3, 4, 6, and 8, the heading estimation models 198 need not directly predict the terminal location of a VRU's jaywalking in order to generate a predicted heading offset. Nonetheless, it may be valuable for the planning system 136 or other aspect of the self-driving car 122 to know the terminal location, e.g., when planning trajectories and maneuvers for the self-driving car's own travel. To that end, the prediction system 192 can further include a heading projection engine 194 that uses the predicted (ultimate) heading of a VRU to predict the terminal location of the VRU's jaywalking. For example, engine 194 may access a roadgraph and/or other maps describing an environment of the VRU. The engine 194 may then project the predicted heading of the VRU over the map from the current location of the VRU to identify a predicted terminal location (e.g., a point along a road edge) where the VRU is predicted to be headed upon the completion of its jaywalking activity. The predicted terminal location can be, for example, a location along a road edge where the predicted heading intersects the road edge. In some implementations, the predicted heading offset generated by the heading estimation model 198 is a discrete value (e.g., a mean value) indicating the single most-likely heading offset of the VRU. In this case, the predicted heading can be projected to identify a discrete point along a road edge (or other environmental feature) as the predicted terminal location. In other implementations, the predicted heading offset outputted by the heading estimation model 198 can include a measure of uncertainty (or, conversely, a measure of confidence) such as a variance that indicates a likely range of predicted heading offsets. In this case, the predicted heading can be projected using this range to identify a segment of a road edge (or other environmental feature) as the predicted terminal location. The VRU may be predicted to intersect the road edge at any point along the segment.

The type of data processed by jaywalking prediction model(s) 196 and heading estimation model(s) 198 may vary depending on the availability of data inputs and the underlying model types used to implement the models 196, 198. In some implementations, the models 196, 198 are not configured to process raw data such as data directly provided by sensing subsystem 132 or data retrieved from object database 180. Instead, the data inputs may require pre-processing either to compute values of engineered features suitable for processing by the predictive models, to format the data in a manner suitable for processing by the models, or both. These functions may be performed by a feature generator 193. In some implementations, a universal feature generator 193 may be provided to process raw/initial data inputs and generate predictive inputs capable of being further processed by a jaywalking prediction model 196 or a heading estimation model 198. In other implementations, multiple feature generators 193 are provided so that different feature generators can be applied to generate features specific to a particular jaywalking prediction model 196 or heading estimation model 198. Based on factors such as the task at hand (e.g., jaywalking prediction or heading offset prediction), the classification type of the VRU, and/or others, the system can select an appropriate feature generator 193 to apply. Further detail of the predictive inputs produced by feature generator(s) 193 are described with respect to FIGS. 3, 5, and 6.

Predicted headings (e.g., predicted heading offsets, predicted absolute or ultimate headings), predicted terminal locations, jaywalking predictions, or a combination of these can be outputted by the behavioral prediction system 192 and shared with one or more other components of the on-board system 130, including planning system 136 and user interface system 138. The planning system 136 can use any individual prediction or combination of predictions to inform fully-autonomous or semi-autonomous driving decisions. For example, if a cyclist located a short distance in front of the self-driving car 122 is predicted to cross lanes and move into the current lane of the self-driving car 122, the planning system 136 may plan a trajectory for the self-driving car 122 that ensures it remains safely clear of the cyclist (e.g., by moving to another lane a distance away from the cyclist or by slowing down to yield to the cyclist). If a pedestrian is predicted to jaywalk across a busy street of traffic, the planning system 136 plan maneuvers for the vehicle that, when executed, cause the self-driving car 122 to slow down, stop, or otherwise yield to the pedestrian. In some implementations, the user interface system 138 can use the predictions from system 192 to visualize the environment for the user with graphical and/or audible descriptions of the prediction. For instance, a display screen in the self-driving car 122 may present a roadmap of the environment around the vehicle. The roadmap may be overlaid with graphical icons representing detected VRUs at their current locations, and predicted headings and/or terminal locations of the VRUs may be projected on the map for informative purposes.

The jaywalking prediction model(s) 196 and heading estimation model(s) 198 may be configured based on various parameters whose values are derived through a training process using a machine-learning algorithm. Values of these model parameters can be stored in a database or other repository 172, and accessed by the behavioral prediction system 192 as needed when evaluating model(s) 196, 198. Roadgraphs, maps, and other environmental data describing features of the environment of the self-driving car 122 can be stored in a database or other repository 185.

Training system 110 is configured to implement machine-learning techniques to train the prediction models 196, 198. The training system 110 can receive training data 125, which can be based in part on data collected from VRU tracking system 186, behavioral prediction system 192, or both. The training data 125 can be labeled to indicate a target prediction for each training sample, and the labeled samples can then be evaluated in a training process. For example, an input component of the training sample may be processed by a training model 114 (corresponding to either the jaywalking prediction model 196 or heading estimation model 198) using current parameter values. A prediction 135 generated by the model 114 is provided to training engine 116, which then compares the prediction 135 to the target prediction of the training sample, and updates the model parameters to minimize any error between the prediction 135 and the target prediction. The updated model parameter values 145 are stored in repository 170, and then re-applied in a next training iteration as the current model parameter values 115 of the model 114 when processing the next training example. Other training algorithms may also be preferred depending on the type of model being trained (e.g., a regression model or a neural network). Once training is complete, a final set of parameter values 171 from training system 110 are loaded into database 172 on the on-board system 130. Additional detail on processes for training a jaywalking prediction model 196 and a heading estimation model 198 are described for FIGS. 7 and 8, respectively.

Figure 2:
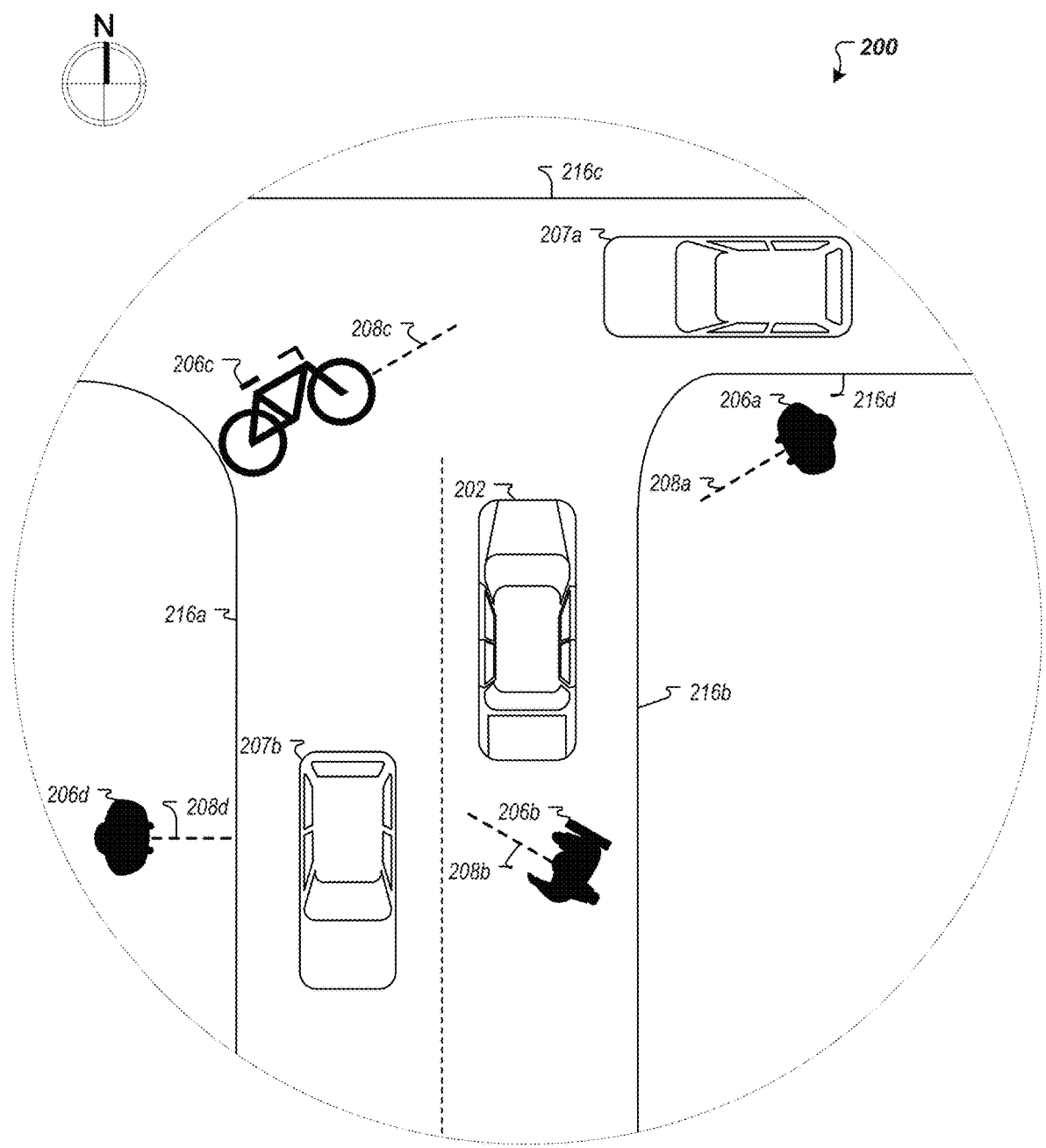
FIG. 2 shows a top-down view of an example physical environment in the vicinity of a self-driving car.

Referring to FIG. 2, a top-down view is shown of a physical environment 200 surrounding a self-driving car 202. At the moment in time captured by FIG. 2, self-driving car 202 is stopped at a T-in the road, where it may turn left onto a one-way street after yielding to other vehicles and complying with other available traffic signals. As shown, the roadways depicted in FIG. 2 are not just occupied by large, licensed vehicles like those represented by cars 202, 206a, and 206b, but are also occupied and surrounded by VRUs including 206a-d. For instance, a first pedestrian 206a stands at the corner between road edges 216b and 216d, a second pedestrian 206b is currently jaywalking behind the self-driving car 202, a third pedestrian 206d is standing to the left of road edge 216a, and a cyclist 206c is crossing (jaywalking) toward road edge 216c. Each VRU 206a-d respectively has a current heading 208a-d, which can indicate a direction that the VRU is currently facing, currently traveling, or both. As the self-driving car 202 plans maneuvers for driving toward its goal location, a sensor subsystem can repeatedly scan the environment 200 to identify VRUs, other obstacles, and environmental features that could influence driving decisions to ensure the car 202 can safely navigate it use of the roadway and avoid collisions or other unsafe interactions with VRUs or other obstacles. This specification describes how the self-driving car 202 can predict jaywalking behaviors of VRUs (e.g., VRUs 206a-d) to predict whether VRUs are or will be jaywalking and to estimate the ultimate headings of the VRUs.

Figure 3:
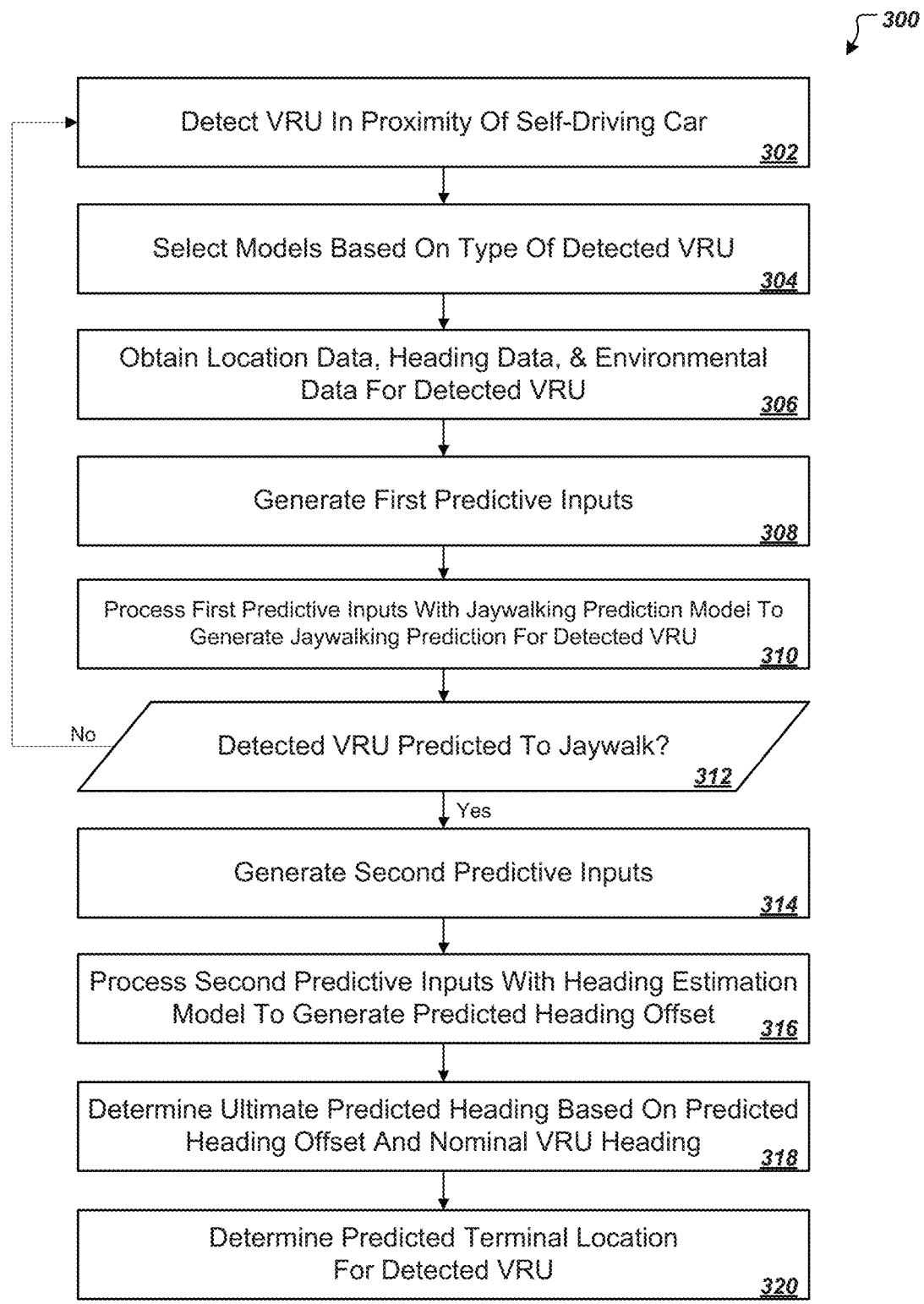
FIG. 3 is a flowchart of an example process for predicting jaywalking behaviors of VRUs located on or near the roadway of a first vehicle.

Turning to FIG. 3, a flowchart is shown of an example process 300 for predicting jaywalking behaviors of the VRUs located on or near the roadway of a first vehicle (e.g., a self-driving car). Process 300 may be carried out by a system of one or more computers, e.g., on-board system 130. The system can begin by detecting a VRU in proximity (e.g., within a predefined distance or within a scanning range of the sensing system) of the first vehicle (302). The VRU can be identified by analyzing LIDAR data, images, and/or other sensor data acquired by a sensing system on-board the first vehicle and applying an object detection and/or recognition algorithm. A classification can also be generated that indicates a type or category of the VRU, e.g., pedestrian, cyclist, scooter, or other low-speed vehicle. Based on the type or category of the VRU, the system can select which models and components to employ in analyzing and predicting the behavior of the VRU (304). For example, an individual jaywalking prediction model can be selected from a library of jaywalking prediction models based on the selected model having been trained on data related to (and thus corresponding to) the identified type or category of the VRU. Similarly, an individual heading estimation model can be selected from a library of heading estimation models based on the selected heading estimation model having been trained on data related to (and thus corresponding to) the identified type or category of the VRU.

Figure 10:
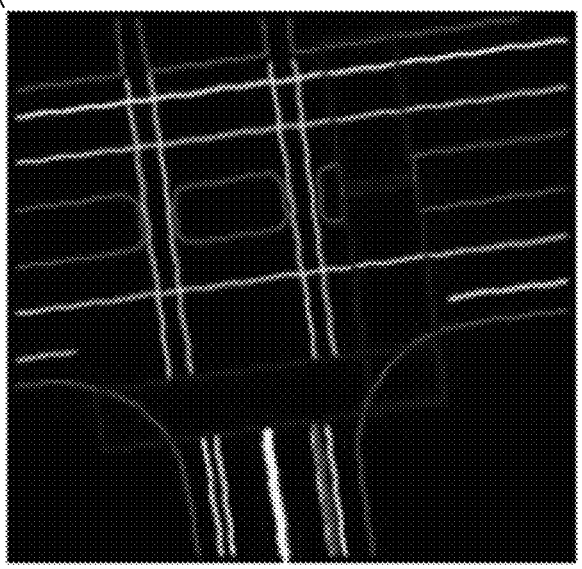
FIG. 10 depicts an example roadgraph for a portion of a roadway encompassing an intersection of streets.

The system can obtain various types of data relevant to the determination of a jaywalking prediction and/or a heading estimation (e.g., for determining a predicted heading offset) (306). Such data can include location data for the detected VRU, heading data for the detected VRU, environmental data for the first vehicle and/or detected VRU, or a combination of these. The location data for a detected VRU can include an indication of the current location of the VRU at a current time step, and optionally a location history indicating previous locations of the VRU at one or more past time steps. The system may determine VRU locations in absolute terms or in relative terms, e.g., relative to the location of the first vehicle. Locations can be determined based on analysis of LIDAR data, images, and/or other sensor data acquired by a sensing system on-board the first vehicle, and/or using other available signals (e.g., GPS signals, triangulation signals). The heading data for a detected VRU can include an indication of the current heading of the VRU at a current time step, and optionally a heading history indicating previous locations of the VRU at one or more past time steps. The system may determine the heading of a VRU based on its instantaneous direction of travel, the orientation of the VRU itself as shown in a representation of the environment (e.g., a point cloud or image), the orientation of a bounding box overlaid on the VRU, or a combination of these or other signals. The environmental data for a detected VRU describes context about the environment of the VRU. The environment of the VRU can be a defined area in proximity of the VRU, or an area surrounding the first vehicle that overlaps with an area in proximity of the VRU, for example. Among other things, the environmental data can include a roadgraph that indicates the geographical flow and locations of roadways in the environment. Roadgraph data can describe various road features (and other environmental features) such as the locations and paths of road edges and lane boundaries. An example roadgraph 1000 is depicted in FIG. 10, for instance, which shows the layout and structure of a roadway at an intersection. The environmental data may further include maps of sidewalks, bike lanes, pedestrian crossways, buildings and structures adjacent to roadways, speed limit data indicating the speed limit at each point or segment of a roadway, and other traffic-control data that could affect driving conditions on a roadway. Some information described by the environmental data may be derived from the system's analysis of sensor data and observations/measurements taken by equipment on the first vehicle. Other information described by the environmental data may be pre-loaded on the system or otherwise obtained from external sources (e.g., via a wired or wireless communications network).

Before predicting a heading of the VRU, the system can first determine whether the first VRU is currently jaywalking, or is likely to jaywalk, on a roadway within a specified time interval. To make this jaywalking prediction, the system generates a first set of predictive inputs that can be processed by a jaywalking prediction model (308). In some implementations, the first set of predictive inputs comprises a collection of values that describe information about the VRU's location at one or more time steps, e.g., a current time step and optionally one or more preceding time steps. The location information reflected in the first set of predictive inputs can be specified in terms of distances, directions, and/or positions/locations of the VRU relative to one or more environmental features (e.g., road edges, lane boundaries, lane midlines, lane regions, traffic lights, traffic signs (e.g., stop or yield signs), sidewalks, traffic circles, other agents or obstacles (e.g., other vehicles or VRUs)) in the vicinity of the VRU. These features in the first set of predictive inputs can be derived from information provided in the location data and environmental data previously obtained. In some implementations, the system obtains and processes data indicative of current or past behavior(s) of the VRU, and a feature generator formats the past behavior data for inclusion in the first set of predictive inputs. For example, the data indicative of past behaviors may describe past locations of the VRU at one or more preceding time steps, past headings of the VRU at one or more preceding time steps, past movements of the VRU at one or more preceding time steps, past lane changes by the VRU at one or more preceding time steps, past changes in direction or heading of the VRU at one or more preceding time steps, past speeds of the VRU at one or more preceding time steps, and/or other behaviors. The past behavior data and corresponding features may be derived directly from sensor data acquired by the device, location data, heading data, environmental data, and/or based on other intermediate features generated by other models in the system. The predictive inputs can also include values representative of these features for one or more other agents (e.g., vehicles or VRUs) in the vicinity of the first VRU. The predictive inputs can also identify properties of the VRU that is the subject of the prediction, such as the classification or type of the VRU (e.g., pedestrian or cyclist, adult or child), speed of the VRU, whether the VRU is flashing lights, dimensions of the VRU (e.g., length/width), or a combination of these.

Figure 5:
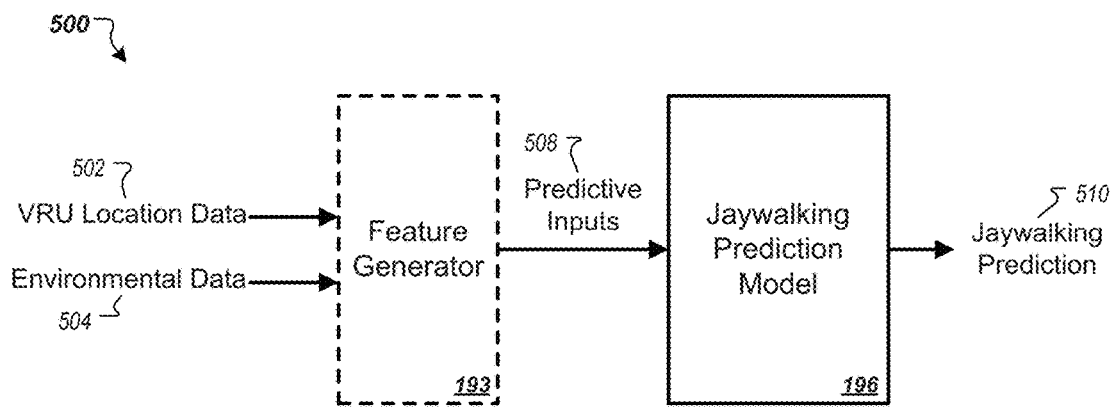
FIG. 5 is a block diagram showing processing of data inputs by a feature generator and a jaywalking prediction model.

With the first set of predictive inputs available, the system can then evaluate the selected jaywalking prediction model based on these inputs (310). The processing at stages 308 and 310 is illustrated in FIG. 5, for example, which shows how a first set of predictive inputs 508 are determined by a feature generator 193 based on the location history 502 of a VRU and environmental data 504. The jaywalking prediction model 196 then processes the first set of predictive inputs 508 to generate a jaywalking prediction 510. The jaywalking prediction generated by the process shown in FIG. 3 (e.g., prediction 510) can be one or more values that indicate a likelihood that the VRU will jaywalk within the prediction time window that is based on a current time step and one or more time steps into the future. In some implementations, the jaywalking prediction is a binary classification indicating that the VRU either is or is not predicted to jaywalk within the prediction time window. For instance, the binary jaywalking prediction can be determined by comparing a score indicating a likelihood (e.g., probability) of the VRU jaywalking to a threshold score. A positive binary prediction can be determined if the score is above the threshold, while a negative binary prediction can be determined if the score is below the threshold.

The jaywalking prediction model (e.g., model 196) can be a machine-learning model in that it is trained using machine-learning algorithms and techniques. In some implementations, the jaywalking prediction model comprises a decision tree model, a regression model, a random decision forest model, an artificial neural network (e.g., a feedforward, recursive, or convolutional neural network), or a combination of these. One example of a process for training a jaywalking prediction model is described with respect to FIG. 7. The nature of the features contained in the predictive inputs and the training algorithm employed can be suitably adapted according to the type of model employed as the jaywalking prediction model. By using a machine-learning model for the jaywalking prediction task, the system may achieve improved accuracy, precision, and recall relative to other approaches such as heuristic-based models. The models may also be trained on a larger dataset than are typically reflected in heuristic-based approaches.

The process 300 may then branch to different operations based on whether the jaywalking prediction indicates that the VRU likely is jaywalking or will jaywalk in the near future, or indicates that the VRU likely is not jaywalking or will not jaywalk in the near future (312). If the latter prediction is determined, process 300 may return to stage 302 and repeat operations for other detected VRU(s). Generally, the system is constantly predicting the behaviors of all or as many detected VRUs as possible within the vicinity of the first vehicle (e.g., the self-driving car). The system may execute process 300 for each VRU in parallel or in rapid succession, and may repeat the process for each detected VRU at each $n^{th}$ time step (e.g., n=1, 2, 3, 5, 10, 15). If the former prediction is determined (i.e., that the VRU likely is jaywalking or will jaywalk in the near future), a second set of predictive inputs can be generated (314) and a heading prediction (e.g., a predicted heading offset) determined (316). In some implementations, the system refrains from proceeding beyond stage 312 and generating a predicted heading for the VRU if the VRU is not predicted to jaywalk in the first instance. Such selective action in generating predicted headings can save computational time and expense when the VRU is unlikely to jaywalk or interfere with the operation of the vehicle.

If the system determines to generate a predicted heading of the VRU, a second set of predictive inputs is generated that can be processed by a heading estimation model (314). The second set of predictive inputs comprises a collection of values that describe information about the VRU's location and/or heading at one or more time steps, e.g., a current time step and optionally one or more preceding time steps. In some implementations, the values of features contained in the second set of predictive inputs are determined with respect to (and thus are conditioned upon) a nominal heading of the VRU. These feature values can then be computed based on a comparison (e.g., a difference) between the nominal heading of the VRU and vectors or headings representing directions between the VRU and one or more specified environmental features (e.g., road edges, lane boundaries, lane midlines, lane regions, traffic lights, traffic signs (e.g., stop or yield signs), sidewalks, traffic circles, buildings, objects, other vehicles or VRUs) in the vicinity of the VRU. For example, the features may indicate a distance between the VRU and a point on a road edge, and may indicate a difference between the nominal heading of the VRU and a direction from the VRU to the point on the road edge. In one embodiment, the VRU's current heading is applied as the nominal heading for purposes of computing the feature values for the second set of predictive inputs. In another embodiment, the nominal heading is computed independent of the actual or current heading of the VRU and is instead defined as the direction of a vector extending from the VRU to a specified reference location. In some examples, the reference location is a point (location) along a road edge or other environmental feature that is closest to the current location of the VRU. In some implementations, the system obtains and processes data indicative of current or past behavior(s) of the VRU, and a feature generator formats the past behavior data for inclusion in the second set of predictive inputs. For example, the data indicative of past behaviors may describe past locations of the VRU at one or more preceding time steps, past headings of the VRU at one or more preceding time steps, past movements of the VRU at one or more preceding time steps, past lane changes by the VRU at one or more preceding time steps, past changes in direction or heading of the VRU at one or more preceding time steps, past speeds of the VRU at one or more preceding time steps, and/or other behaviors. The past behavior data and corresponding features may be derived directly from sensor data acquired by the device, location data, heading data, environmental data, and/or based on other intermediate features generated by other models in the system. The predictive inputs can also include values representative of these features for one or more other agents (e.g., vehicles or VRUs) in the vicinity of the first VRU. The predictive inputs can also identify properties of the VRU that is the subject of the heading estimation, such as the classification or type of the VRU (e.g., pedestrian or cyclist, adult or child), speed of the VRU, whether the VRU is flashing lights, dimensions of the VRU (e.g., length/width), or a combination of these.

Figure 6:
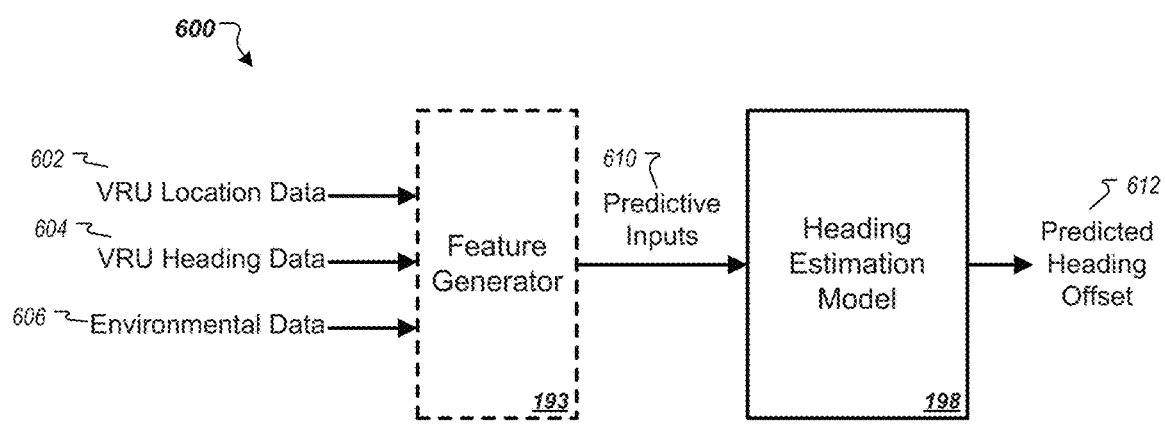
FIG. 6 is a block diagram showing processing of data inputs by a feature generator and a heading estimation model.

With the second set of predictive inputs available, the system can then evaluate the selected heading estimation model based on these inputs (316) to generate a predicted heading offset for the VRU. The processing at stages 314 and 316 is illustrated in FIG. 6, for example, which shows how a second set of predictive inputs 610 are determined by a feature generator 193 based on VRU location data 602, VRU heading data 604, and environmental data 606. The heading estimation model 198 then processes the second set of predictive inputs 610 to generate a predicted heading offset 612. The predicted heading offset, e.g., offset 612, which is emitted by the heading estimation model, indicates a difference between a predicted ultimate heading of the VRU and the VRU's nominal heading at the current time step. For embodiments where the nominal heading corresponds to the actual current heading of the VRU, the predicted heading offset indicates how much the VRU's current heading is predicted to change to reach a terminal location for the VRU's jaywalking activity (e.g., a point along a road edge where the VRU is predicted to be heading). For embodiments where the nominal heading corresponds to a heading between the VRU's current location and a specified reference location, the predicted heading offset indicates how much this computed heading is predicted to change to reach a terminal location for the VRU's jaywalking activity. With the predicted heading offset from the heading estimation model, the system can determine the predicted ultimate heading as an absolute value by adding the predicted heading offset to the nominal heading of the VRU (318).

In some implementations, the heading estimation model outputs information reflecting a measure of confidence or uncertainty in the heading estimation. For example, a mean or most probably heading offset can be predicted in addition to a variance associated with the prediction. The heading estimation model may output a range (e.g., including a lower-bound and upper-bound) of heading offsets corresponding to predicted heading offsets having at least a minimum level of confidence or probability. The variance or range of the predicted heading offset can be applied to the ultimate predicted heading as well.

The heading estimation model need not explicitly predict the terminal location of the VRU in order to generate the predicted heading offset. Rather, the heading estimation model may be configured to compute the predicted heading offset directly from the second set of predictive inputs. Nonetheless, the planner or operator of a self-driving car may still find use in obtaining an explicit indication of the predicted terminal location of the VRU. Accordingly, in some implementations, the system may project the ultimate predicted heading on a map of the environment (or other representations of the environment) to predict the terminal location of the VRU (320). The predicted terminal location can be a discrete point along an environmental feature (e.g., a road edge) where the VRU is predicted to complete jaywalking. Alternatively, the predicted terminal location can include a range of possible locations such as a segment of an environmental feature (e.g., a road edge). For example, the heading estimation model may output a variance or confidence level associated with the predicted heading offset. The range of predicted terminal locations can encompass the interval of locations for which at least a threshold or other defined level of confidence exists for the prediction. A predicted terminal location can be identified, for example, by extending the ultimate predicted heading of the VRU from the VRU's current location to a qualifying environmental feature (e.g., a road edge). The point or segment where the heading intersects the feature can be the predicted terminal location or segment. The planning system of the self-driving car may then use the jaywalking prediction, predicted heading offset, ultimate predicted heading, predicted terminal location, or a combination of these, to determine driving maneuvers that safely avoid VRUs. Any of these measures may also be stored in a log for later analysis, presented to a user in a user interface, or applied to other desired ends.

The heading estimation model (e.g., model 198) can be a machine-learning model in that it is trained using machine-learning algorithms and techniques. In some implementations, the heading estimation model comprises a regression model or an artificial neural network (e.g., a feedforward, recursive, or convolutional neural network). One example of a process for training a heading estimation model is described with respect to FIG. 8. The nature of the features contained in the predictive inputs and the training algorithm employed can be suitably adapted according to the type of model employed as the heading estimation model. By using a machine-learning model for the jaywalking prediction task, the system may achieve improved accuracy, precision, and recall relative to other approaches such as heuristic-based models. The models may also be trained on a larger dataset than are typically reflected in heuristic-based approaches.

Figure 4:
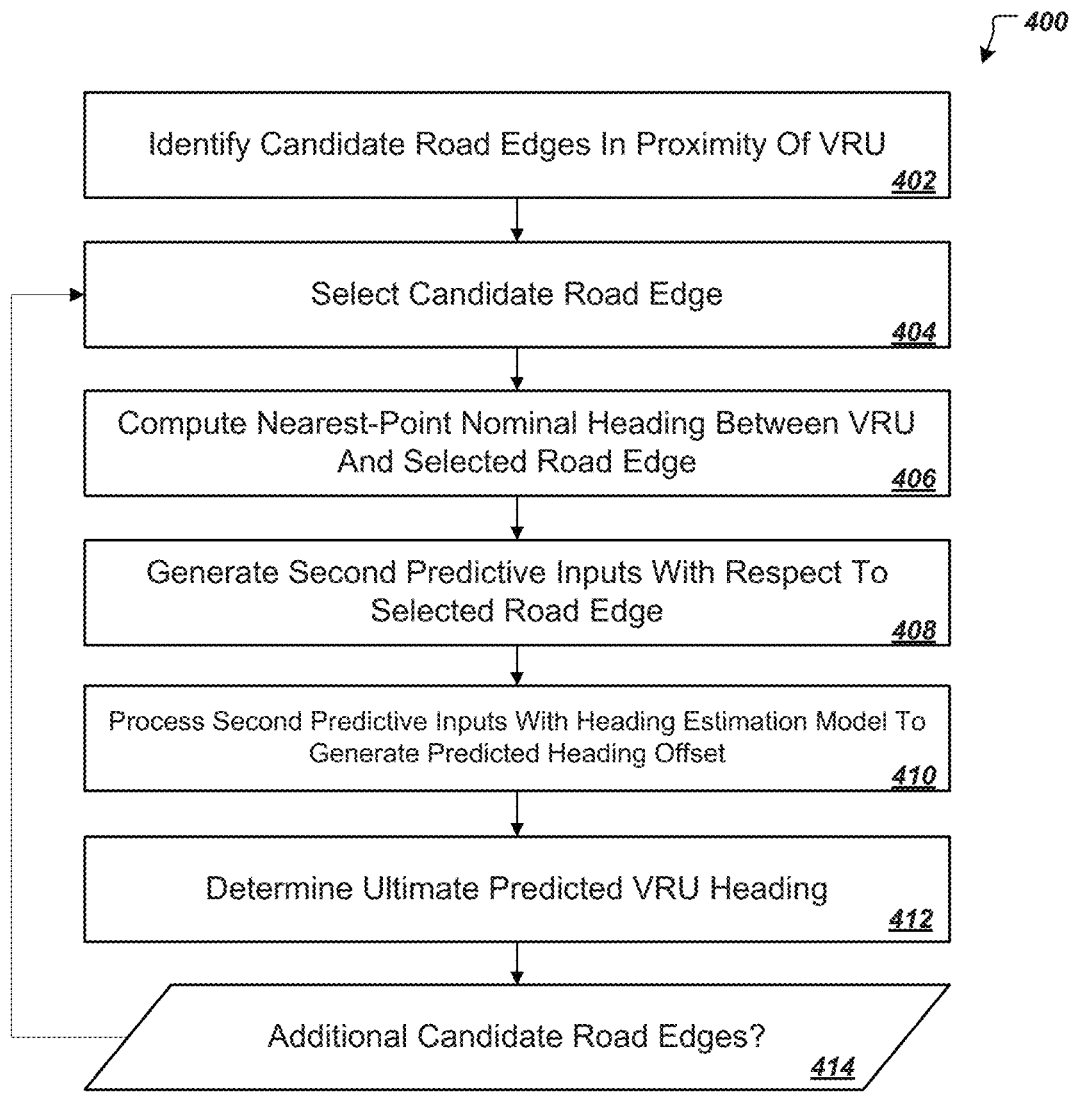
FIG. 4 is a flowchart of an example process for predicting the heading of a VRU based on a nominal heading computed with respect to a set of candidate road edges.

FIG. 4 is a flowchart of an example process 400 for predicting the heading of a VRU based on a nominal heading computed with respect to a set of candidate road edges. The process can be carried out by a system of one or more computers, e.g., on-board system 130. Process 400 can be invoked, for example, to determine a set of predicted terminal locations when it is unknown which environmental feature (e.g., road edge) a VRU is most likely to head toward as a destination of a jaywalking incident. In some implementations, process 400 can be invoked to determine a most likely environmental feature a VRU is most likely to head toward as a destination of a jaywalking incident. Typically, the process 400 is executed in response to determining that a detected VRU is likely to engage in jaywalking (e.g., as indicated by a jaywalking prediction generated by a jaywalking prediction model). The system identifies a set of candidate road edges in proximity to the VRU (402). For a first iteration, a first candidate road edge is selected from the set (404). The system determines a point on the selected road edge that is closest to the VRU, and computes a nominal heading between the VRU and the closest point (406). A set of predictive inputs can be generated, which are conditioned on the nominal heading in a like manner to that described with respect to operation 314 (FIG. 3) (408). The system can then evaluate the heading estimation model based on the set of predictive inputs to determine a predicted heading offset with respect to the nominal heading (410). The predicted heading offset and nominal heading can be combined (e.g., summed) to determine the ultimate (absolute) predicted heading for the VRU (412). The ultimate predicted heading can then be used for planning driving decisions of a self-driving car, visualizing predicted behaviors of VRUs, or other applications. The process 400 can be repeated if additional road edges remain to be analyzed (414). In some implementations, once all candidate road edges have been considered, the system may compare confidence levels or probability scores associated with the predicted heading for each edge and select one of the candidate road edges associated with the highest confidence or probability score as the most likely road edge to which the VRU is headed.

Figure 7:
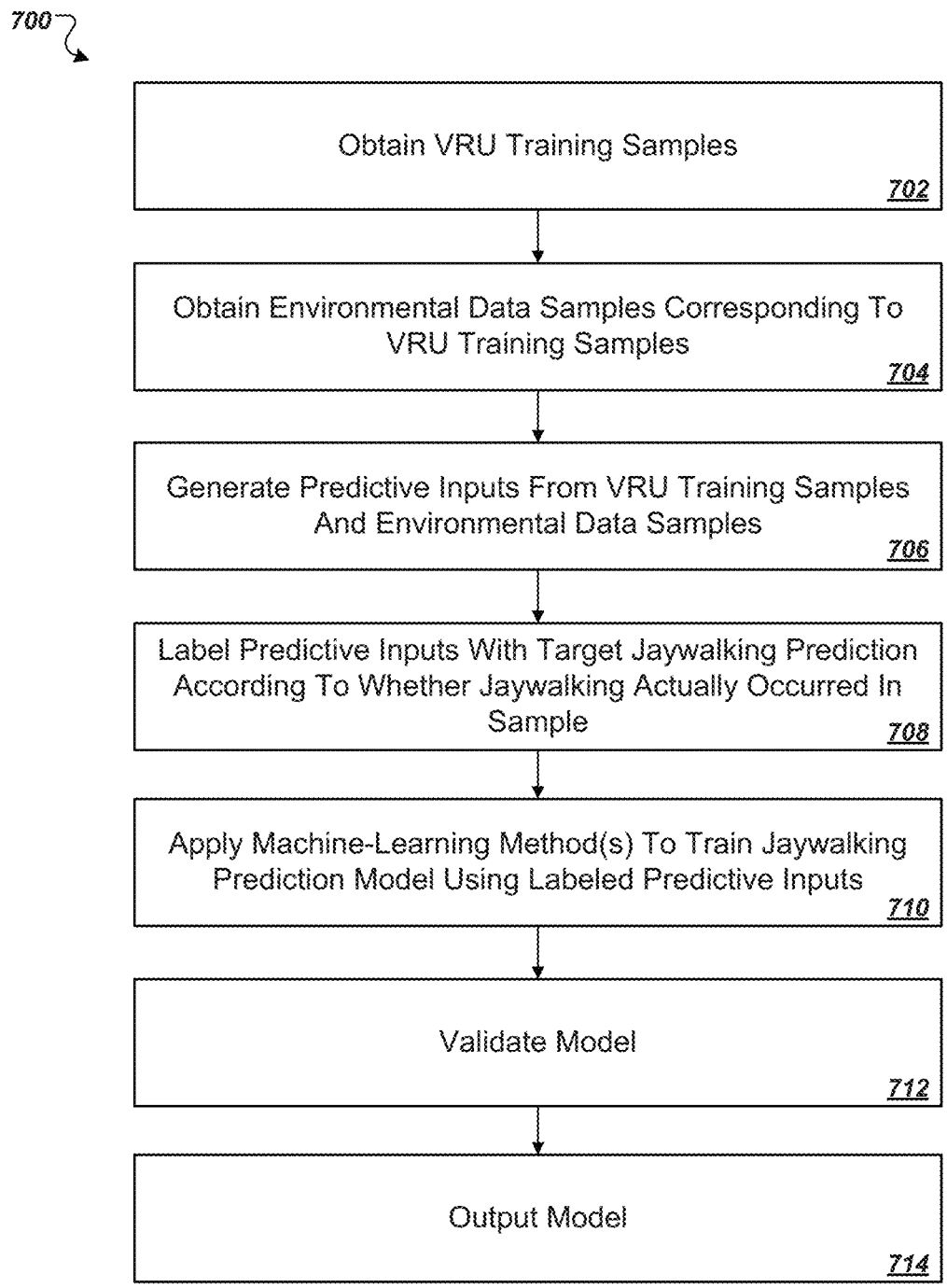
FIG. 7 is a flowchart of an example process for training a jaywalking prediction model.

FIG. 7 depicts a flowchart of an example process 700 for training a jaywalking prediction model using machine-learning techniques. The system may be carried out by a system of one or more computers, e.g., training system 110. To start, the system obtains VRU training samples that each describe relevant information about a VRU (802). For example, the training sample may indicate a location of the VRU at a current time step, and optionally at one or more preceding time steps (702). In some implementations, the VRU training samples contain additional information beyond location data, such as information about current or recent movements (e.g., speed and/or direction) of the VRU. Different VRUs may be represented in different training samples, although some training samples may be based on the same VRU. If a universal model is being trained, the training samples may include samples representing several different types of VRUs (e.g., pedestrians, cyclists, scooters). If a type-specific model is being trained, all the training samples may pertain to VRUs of the same type. Environmental training samples can also be obtained that describe environmental features (e.g., features indicated by roadgraphs) for the environment around the VRUs (704). Each VRU training sample can be associated with a corresponding environmental training sample so that information about the environment of the VRU can be referenced. The system can then generate predictive inputs for each pair of VRU and environmental training samples, e.g., by computing features pertaining to relationships between the VRU and features in the environment of the VRU (706). The predictive inputs can be generated in a like manner to that described with respect to operation 308 (FIG. 3). Each set of predictive inputs can be labeled with a target jaywalking prediction according to whether the VRU represented by the predictive input jaywalked at the current time step of the corresponding VRU training sample or whether the VRU represented by the predicted input jaywalked in one or more future time steps of the corresponding VRU training sample (708). If jaywalking actually occurred at the current time step or future time step(s), the set of predictive inputs are assigned a positive target jaywalking prediction. If jaywalking did not actually occur at these time steps, the set of predicted inputs are assigned a negative jaywalking prediction. An appropriate supervised machine-learning algorithm can then be applied to train the jaywalking prediction model based on the labeled sets of predictive inputs (710). Different algorithms may apply depending on the type of model being trained. For example, backpropagation and gradient descent can be applied to train a neural network, ID3 or CART can be applied to train a decision tree, or a regression algorithm can be applied to train a classification model. The model can then be validated (712), and provided for use, e.g., on-board a self-driving car (714).

Figure 8:
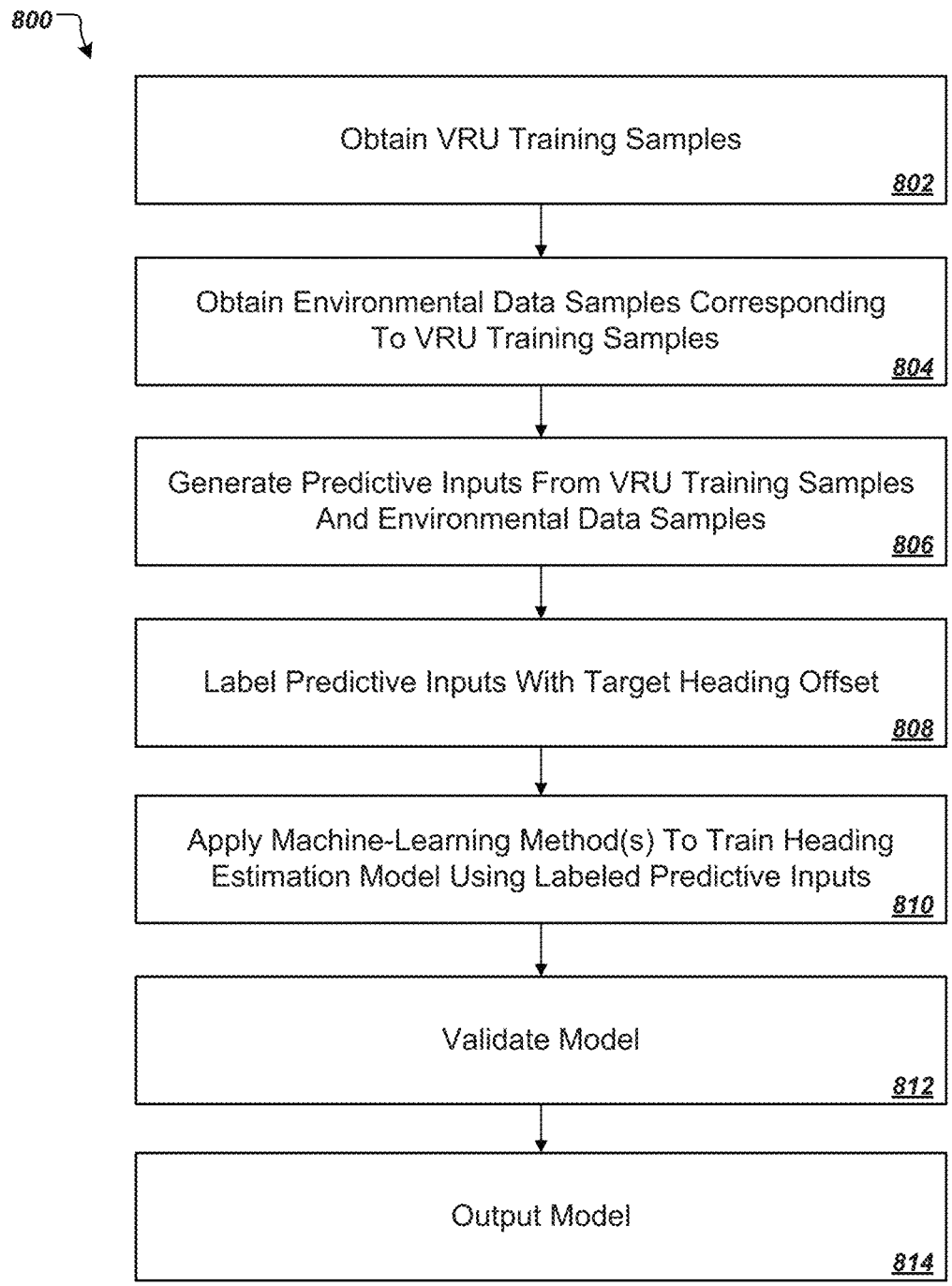
FIG. 8 is a flowchart of an example process for training a heading estimation model.

FIG. 8 depicts a flowchart of an example process 800 for training a heading estimation model using machine-learning techniques. The system may be carried out by a system of one or more computers, e.g., training system 110. To start, the system obtains VRU training samples that each describe relevant information about a VRU (802). For example, the training sample may indicate a location of the VRU at a current time step, and optionally at one or more preceding time steps. The training sample may further indicate a heading of the VRU at the current time step, and optionally at the one or more preceding time steps. In some implementations, the VRU training samples contain additional information beyond location and heading data, such as information about current or recent movements (e.g., speed and/or direction) of the VRU. Different VRUs may be represented in different training samples, although some training samples may be based on the same VRU. If a universal model is being trained, the training samples may include samples representing several different types of VRUs (e.g., pedestrians, cyclists, scooters). If a type-specific model is being trained, all the training samples may pertain to VRUs of the same type. Environmental training samples can also be obtained that describe environmental features (e.g., features indicated by roadgraphs) for the environment around the VRUs (804). Each VRU training sample can be associated with a corresponding environmental training sample so that information about the environment of the VRU can be referenced. The system can then generate predictive inputs for each pair of VRU and environmental training samples, e.g., by computing features pertaining to relationships between the VRU and features in the environment of the VRU (706). At least some of the features are conditioned on a nominal heading of the VRU. In one embodiment, the nominal heading is the current heading of the VRU itself. In another embodiment, the nominal heading is based on the direction between VRU and a specified reference location such as the closest point of a selected environmental feature (e.g., a road edge). The predictive inputs can be generated in a like manner to that described with respect to operation 314 (FIG. 3). Each set of predictive inputs can then be labeled with a target heading offset (808). The target heading offset can be determined by identifying from the training samples the terminal location of the VRU at the conclusion of its jaywalking incident, determining a heading from the VRU to the actual terminal location, and determining an offset between the heading to the terminal location and the nominal heading. This analysis may require looking at recorded data logs associated with the training samples one or more time steps into the future from the current time step. An appropriate supervised machine-learning algorithm can then be applied to train the heading estimation model based on the labeled sets of predictive inputs (810). Different algorithms may apply depending on the type of model being trained. For example, backpropagation and gradient descent can be applied to train a neural network, ID3 or CART can be applied to train a decision tree, or a regression algorithm can be applied to train a regression model. The model can then be validated (812), and provided for use, e.g., on-board a self-driving car (814).

Figure 9:
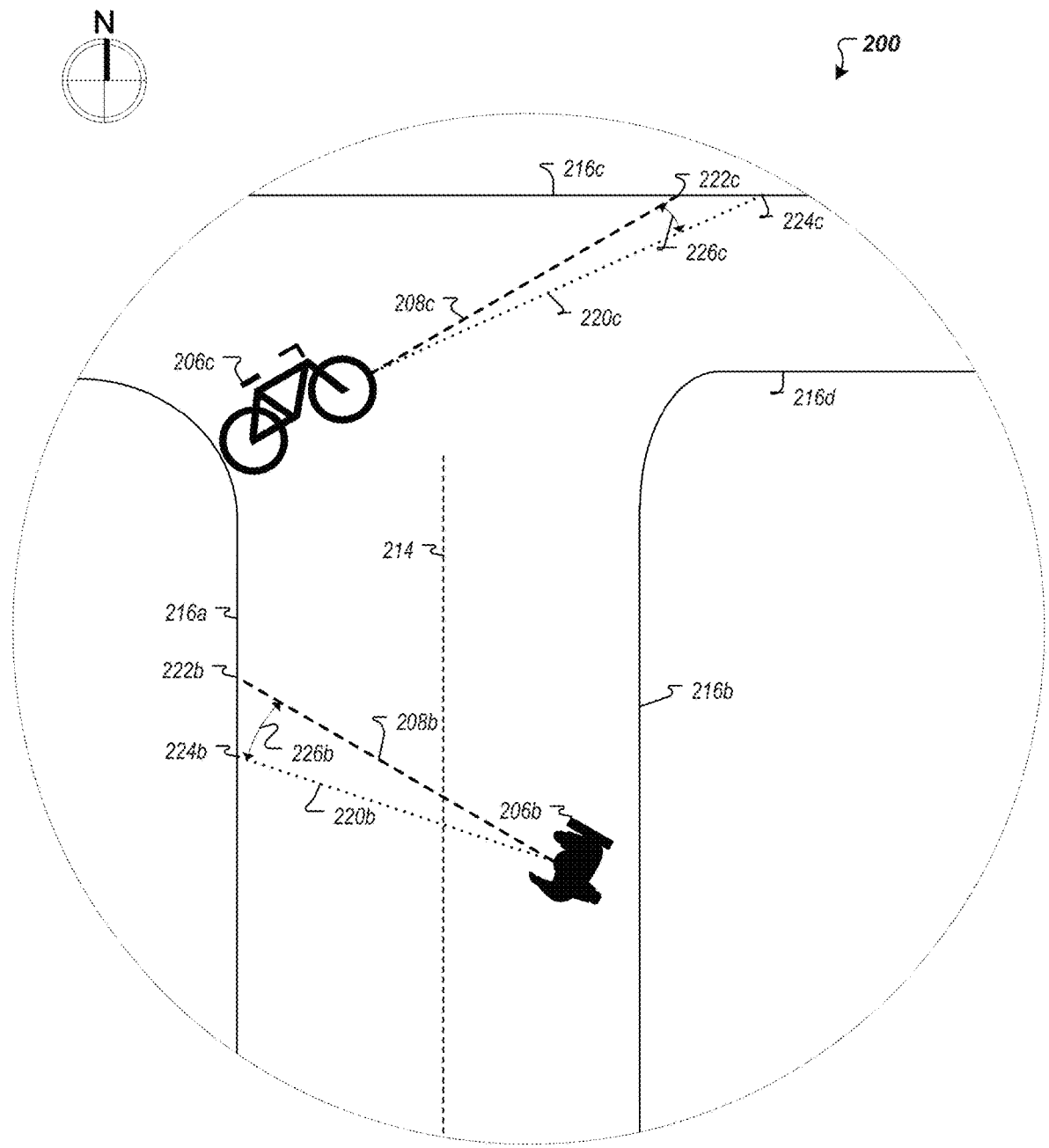
FIG. 9 shows a top-down view of an example physical environment in the vicinity of a self-diving car. Headings of certain VRUs in the vicinity are shown.

To illustrate the concepts of heading offsets, ultimate headings, and terminal locations, FIG. 9 depicts a similar top-down view of an environment 200 to that shown in FIG. 2. In this case, however, the view focuses on two VRUs—a pedestrian 206b and a cyclist 206c. The dashed lines projecting from the VRUs 206b, 206c represent different heading concepts. Specifically, for pedestrian 206b, the first dashed line 208b indicates the current heading of the pedestrian 206b. This is the direction that the pedestrian 206b is currently facing and/or traveling. If the pedestrian 206b were to continue moving linearly along the path of the current heading 208b, he would intersect road edge 216a at terminal location 222b. In fact, however, the pedestrian 206b may stray from this course for any number of reasons and actually intersect the road edge 216a at terminal location

224b. The ultimate heading 220b represents the direction between the pedestrian's current location and the ultimate terminal location 224b. The difference between ultimate heading 220b and current heading 208b is the heading offset 226b of the pedestrian 206b. Similarly, for cyclist 206c, the first dashed line 208c indicates the current heading of the cyclist 206c. This is the direction that the cyclist 206c is currently facing and/or traveling. If the cyclist 206c were to continue moving linearly along the path of the current heading 208c, she would intersect road edge 216c at terminal location 222c. In fact, however, the cyclist 206c may stray from this course for any number of reasons and actually intersect the road edge 216c at terminal location 224c. The ultimate heading 220c represents the direction between the cyclist's current location and the ultimate terminal location 224c. The difference between ultimate heading 220c and current heading 208c is the heading offset 226c of the cyclist 206c.

In some implementations, the jaywalking prediction model and heading estimation model can be configured to directly process raw input data, such as LIDAR data or images showing the environment of a VRU at one or more time steps. With these techniques, similar operations can be performed in terms of predicting whether jaywalking is likely to occur, and if so, predicting a heading offset of the VRU. However, the nature of the predictive inputs processed by the models may differ. For example, this approach eliminates any need to compute values of engineered features for processing by the models. Deep neural networks may be well-suited for these tasks, for example. Further, in some implementations, the techniques disclosed herein can be applied to other agents beyond vulnerable road users detected in the vicinity of a self-driving car or roadway.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method performed by a system of one or more computers, comprising:
   obtaining location data that identifies a current location of a vulnerable road user (VRU) detected within a vicinity of a vehicle traveling on a roadway;
   obtaining environmental data that describes an environment of the VRU, wherein the environmental data identifies a plurality of environmental features in the environment of the VRU;
   determining a nominal heading of the VRU;
   generating a set of predictive inputs that indicate, for each of at least a subset of the plurality of environmental features, a physical relationship between the VRU and the environmental feature, wherein the physical relationship is determined with respect to the nominal heading of the VRU and the current location of the VRU;
   processing the set of predictive inputs with a heading estimation model to determine a predicted heading offset of the VRU, wherein the predicted heading offset indicates a difference between (i) a direction of a vector defined by the nominal heading of the VRU and (ii) a direction of a vector from the current location of the VRU to a predicted terminal location of the VRU's movements; and
   directing the vehicle to implement an autonomous driving decision generated using the predicted heading offset of the VRU.

2. The method of claim 1, comprising assigning a current heading of the VRU as the nominal heading of the VRU.

3. The method of claim 1, comprising:
   selecting a first environmental feature of the plurality of environmental features; and
   determining a location of a point along the first environmental feature;
   wherein determining the nominal heading of the VRU comprises determining a first vector between the current location of the VRU and the point along the first environmental feature, and assigning a direction of the first vector as the nominal heading of the VRU.

4. The method of claim 3, wherein:
   the first environmental feature is a road edge;
   the point along the first environmental feature is selected based on being the closest point along the road edge to the VRU; and
   the nominal heading indicates a direction from the current location of the VRU to the closest point along the road edge.

5. The method of claim 1, comprising:
   determining, based on a location history of the VRU and the environmental data, a jaywalking prediction that indicates whether the VRU is jaywalking or is likely to jaywalk on the roadway traveled by the vehicle;
   wherein the system generates the predicted heading offset for the VRU in response to the jaywalking prediction indicating that the VRU is jaywalking or is likely to jaywalk on the roadway traveled by the vehicle.

6. The method of claim 5, wherein the system is configured not to generate a predicted heading offset for the VRU in response to the jaywalking prediction indicating that the VRU is not jaywalking and is not likely to jaywalk on the roadway traveled by the vehicle.

7. The method of claim 5, comprising:
   generating a second set of predictive inputs based on the location history of the VRU and the environmental data; and processing the second set of predictive inputs with a jaywalking prediction model to generate the jaywalking prediction, wherein the jaywalking prediction model is a machine-learning model that was trained using a supervised machine-learning technique.

8. The method of claim 7, wherein the jaywalking prediction model comprises a decision tree, a random decision forest, an artificial neural network, or a regression model.

9. The method of claim 1, wherein the plurality of environmental features include at least one of a road edge, a lane boundary, a sidewalk, a bicycle lane, a road curb, or an intersection.

10. The method of claim 1, wherein the VRU is a pedestrian, a cyclist, or a low-speed motorized vehicle.

11. The method of claim 1, wherein the vehicle is a fully autonomous or semi-autonomous vehicle.

12. The method of claim 1, comprising:
analyzing sensor data captured by a sensing system of the vehicle to classify the VRU as one of a plurality of pre-defined VRU types; and
selecting, from among a plurality of pre-defined heading estimation models that correspond to different ones of the plurality of pre-defined types of VRUs, a first heading estimation model to use as the heading estimation model for processing the set of predictive inputs and generating the predicted heading offset for the VRU, the first heading estimation model corresponding to the classified type of the VRU.

13. The method of claim 1, wherein the heading estimation model is a machine-learning model that was trained using a supervised machine-learning technique.

14. The method of claim 1, wherein the physical relationship between the VRU and a first environmental feature of the plurality of environmental features, as indicated by a first predictive input of the set of predictive inputs, comprises at least one of a positional relationship, a distal relationship, or an angular relationship between the VRU and the first environmental feature.

15. The method of claim 1, comprising generating a predicted heading of the VRU by adding the predicted heading offset for the VRU to the nominal heading of the VRU.

16. The method of claim 1, comprising selecting a location of a point along a first environmental feature of the plurality of environmental features, wherein determining the nominal heading of the VRU comprises determining a direction of a vector from the current location of the VRU to the location of the selected point along the first environmental feature.

17. The method of claim 16, wherein the first environmental feature is a road edge and selecting the location of the point along the first environmental feature comprises selecting a location of the road edge that is closest to the current location of the VRU.

18. A system, comprising:
a memory; and
one or more computers configured to:
obtain location data that identifies a current location of a vulnerable road user (VRU) detected within a vicinity of a vehicle traveling on a roadway;
obtain environmental data that describes an environment of the VRU, wherein the environmental data identifies a plurality of environmental features in the environment of the VRU;
determine a nominal heading of the VRU;
generate a set of predictive inputs that indicate, for each of at least a subset of the plurality of environmental features, a physical relationship between the VRU and the environmental feature, wherein the physical relationship is determined with respect to the nominal heading of the VRU and the current location of the VRU;
processing the set of predictive inputs with a heading estimation model to determine a predicted heading offset of the VRU, wherein the predicted heading offset indicates a difference between (i) a direction of a vector defined by the nominal heading of the VRU and (ii) a direction of a vector from the current location of the VRU to a predicted terminal location of the VRU's movements; and
direct the vehicle to implement an autonomous driving decision generated using the predicted heading offset of the VRU.

19. One or more non-transitory computer-readable media encoded with instructions that, when executed by data processing apparatus, cause the data processing apparatus to perform operations comprising:
obtaining location data that identifies a current location of a vulnerable road user (VRU) detected within a vicinity of a vehicle traveling on a roadway;
obtaining environmental data that describes an environment of the VRU, wherein the environmental data identifies a plurality of environmental features in the environment of the VRU;
determining a nominal heading of the VRU;
generating a set of predictive inputs that indicate, for each of at least a subset of the plurality of environmental features, a physical relationship between the VRU and the environmental feature, wherein the physical relationship is determined with respect to the nominal heading of the VRU and the current location of the VRU;
processing the set of predictive inputs with a heading estimation model to determine a predicted heading offset of the VRU, wherein the predicted heading offset indicates a difference between (i) a direction of a vector defined by the nominal heading of the VRU and (ii) a direction of a vector from the current location of the VRU to a predicted terminal location of the VRU's movements; and
directing the vehicle to implement an autonomous driving decision generated using the predicted heading offset of the VRU.

* * * * *